(12) United States Patent
Kim et al.

(10) Patent No.: US 9,006,936 B2
(45) Date of Patent: Apr. 14, 2015

(54) POWER TRANSMISSION APPARATUS AND POWER RECEPTION APPARATUS

(75) Inventors: Yong Hae Kim, Daejeon (KR); Seung Youl Kang, Daejeon (KR); Sang Hoon Cheon, Daejeon (KR); Myung Lae Lee, Daejeon (KR); Taehyoung Zyung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 537 days.

(21) Appl. No.: 13/491,112

(22) Filed: Jun. 7, 2012

(65) Prior Publication Data

US 2013/0020876 A1 Jan. 24, 2013

(30) Foreign Application Priority Data

Jul. 22, 2011 (KR) .................... 10-2011-0072830

(51) Int. Cl.
*H02J 5/00* (2006.01)
*H01F 27/42* (2006.01)

(52) U.S. Cl.
CPC ...................................... *H02J 5/005* (2013.01)

(58) Field of Classification Search
USPC ........................................................ 307/104
See application file for complete search history.

(56) References Cited

FOREIGN PATENT DOCUMENTS

KR 10-0806562 B1 2/2008
KR 10-0898059 B1 5/2009

OTHER PUBLICATIONS

André Kurs et al., "Wireless Power Transfer via Strongly Coupled Magnetic Resonances", Science, Jul. 6, 2007, pp. 83-86, vol. 317.

*Primary Examiner* — Robert Deberadinis
(74) *Attorney, Agent, or Firm* — Rabin & Berdo, P.C.

(57) ABSTRACT

A power transmitter includes a signal processor that externally obtains a reception power state signal depending on variation of a distance between transmission and reception coil units, a modulation controller configured to a modulation frequency for selecting a frequency band having maximum power transmission performance, based on the reception power state signal, a power signal generator that generates a power signal, and a modulator that modulates the power signal in response to the modulation frequency, the reception coil unit being configured to transmit the modulated signal. A power receiver includes a reception coil unit that receives a power signal, a power generator that generates power by receiving the power signal from the reception coil unit, and a signal generator that generates a reception power state signal depending on the generated power level and transmits the latter signal to a transmission coil unit corresponding to the reception coil unit.

8 Claims, 6 Drawing Sheets

POWER TRANSMISSION APPARATUS AND POWER RECEPTION APPARATUS

CROSS-REFERENCE TO RELATED APPLICATIONS

This U.S. non-provisional patent application claims priority under 35 USC §119 to Korean Patent Application No. 10-2011-0072830, filed on Jul. 22, 2011, the entirety of which is hereby incorporated by reference.

BACKGROUND OF THE INVENTION

The present general inventive concept relates to power transmission systems and, more particularly, to a power transmission apparatus with improve power transmission performance and a power reception apparatus.

A power transmission system is a system employing a wireless power transmission technology and includes a power transmitter configured to transmit power and a power receiver configured to receive power. By matching a resonant frequency, power is wirelessly transmitted and received between the power transmitter and the power.

When a distance for power transmission between a power transmitter and a power receiver is constant, power may be transmitted and received using a predetermined resonant frequency. However, since the power transmitter and the power receiver are independent of each other, a distance for mutual power transmission therebetween may not be constant. Thus, resonant frequency characteristics must be adjusted depending on distance variation to prevent degradation in power transmission performance between the power transmitter and the power receiver, e.g., coils for power transmission and reception. Unfortunately, a power transmitter and a power receiver of a conventional power transmission system are not capable of adjusting a resonant frequency depending on distance variation.

SUMMARY OF THE INVENTION

Embodiments of the inventive concept provide a power transmitter and a power receiver.

According to an aspect of the inventive concept, a power transmitter may include a signal processor configured to externally obtain a reception power state signal depending on variation of a distance between a transmission coil unit and a reception coil unit; a modulation controller configured to a modulation frequency for selecting a frequency band having maximum power transmission performance, based on the reception power state signal; a power signal generator configured to generate a power signal; a modulator configured to modulate the power signal in response to the modulation frequency; and the reception coil unit configured to transmit the modulated power signal.

In some exemplary embodiments, the reception power state signal may include information on a voltage or current of received power.

In some exemplary embodiments, the modulation controller may include a frequency selector configured to sequentially select frequencies within a predetermined frequency range when a frequency does not have the maximum power transmission performance based on the reception power state signal; and a modulation frequency generator configured to generate a modulation frequency for modulating the power signal according to the selected frequencies.

In some exemplary embodiments, the frequency selector may select a frequency having maximum power transmission performance within the predetermined frequency range as a frequency for power transmission by using all frequencies within the predetermined frequency range when the modulation of the power signal is completed.

In some exemplary embodiments, the signal processor may further include an impedance matcher configured to change an impedance value to have a predetermined impedance value when there is a need to change the impedance value according to the reception power state signal.

According to another aspect of the inventive concept, a power receiver may include a reception coil unit configured to receive a power signal; a power generator configured to generate power by receiving the power signal from the reception coil unit; and a signal generator configured to generate a reception power state signal depending on the level of the generated power and transmit the reception power state signal to a transmission coil unit corresponding to the reception coil unit.

In some exemplary embodiments, the reception power state signal may include information on a voltage or current of received power.

In some exemplary embodiments, the power receiver may further include a load configured to consume the generated power; and an impedance matcher configured to output the power signal to the power generator through impedance matching depending on power consumption of the load.

BRIEF DESCRIPTION OF THE DRAWINGS

The inventive concept will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the inventive concept.

DETAILED DESCRIPTION

The inventive concept will now be described more fully hereinafter with reference to the accompanying drawings, in which preferred embodiments of the inventive concept are shown. However, the inventive concept may be embodied in many different forms and should not be construed as limited to the embodiments set forth herein. Rather, these embodiments are provided so that this disclosure will be thorough and complete, and will fully convey the scope of the inventive concept to those skilled in the art. Like numbers refer to like elements throughout.

Figure 1:
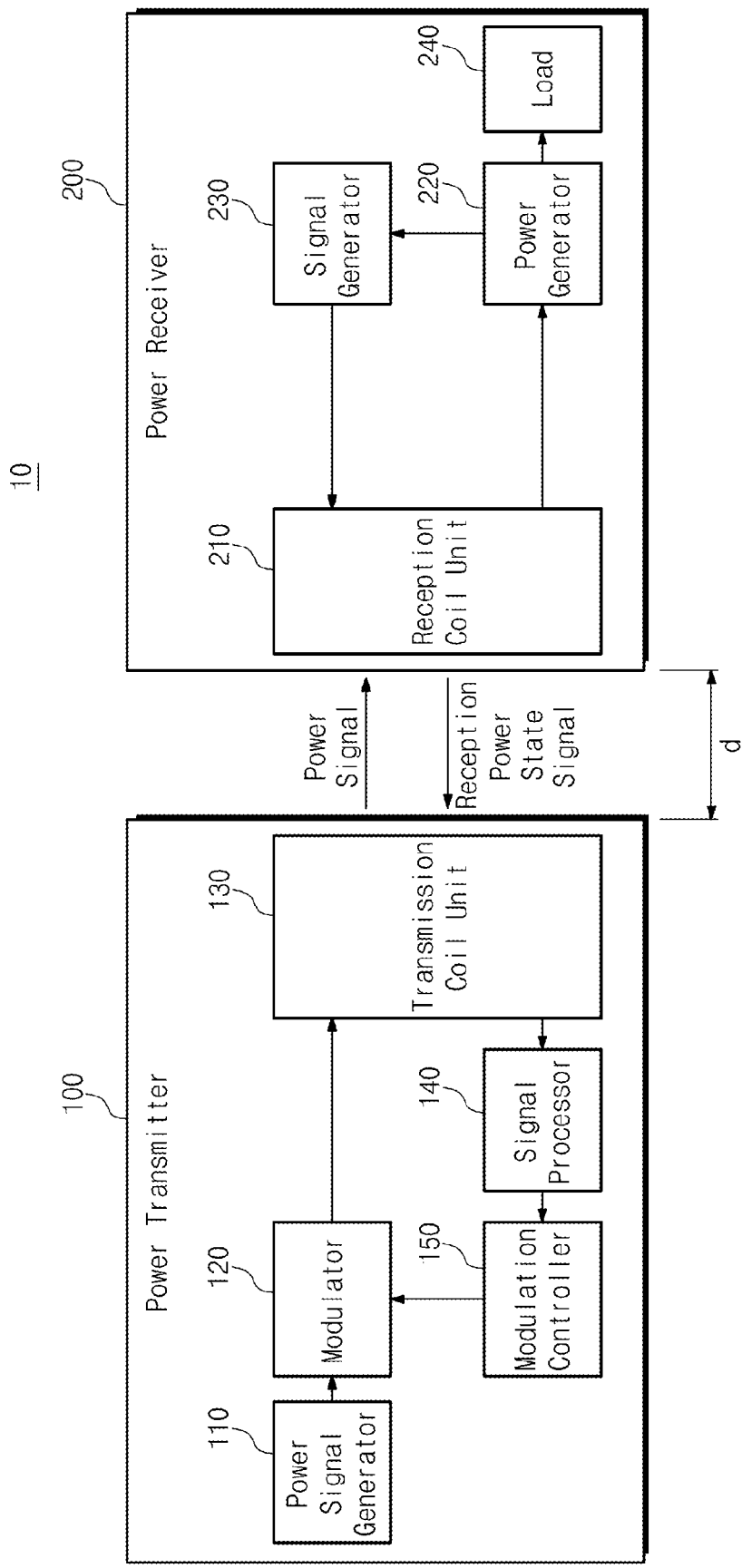
FIG. 1 illustrates a power transmission system according to one embodiment of the inventive concept.

Reference is made to FIG. 1, which illustrates a power transmission system 10 according to one embodiment of the inventive concept. The power transmission system 10 includes a power transmitter 100 and a power receiver 200.

The power transmitter 100 may transmit power to the power receiver 200 in a wireless manner. The power transmitter 100 may include a power signal generator 110, a modulator 120, a transmission coil unit 130, a signal processor 140, and a modulation controller 150.

The power signal generator 110 generates a power signal through an internal power source or a connected power source. The signal generator 110 outputs the generated power signal to the modulator 120.

The modulator 120 receives a power signal and modulates the received power signal using an input modulation frequency. The modulation frequency may be within a frequency band (e.g., band of 100 kHz to 13 MHz). The modulator 120 outputs the power signal modulated using the modulation frequency to the reception coil unit 130.

The reception coil unit 130 transmits the received power signal to the power receiver 200. The reception coil unit 130 may include, for example, two coils. The reception coil unit 130 receives a reception power state signal from the power receiver 200. The reception coil unit 130 outputs the reception power state signal to the signal processor 140.

The signal processor 140 may receive the reception power state signal, based on the reception power state signal. The reception power state signal includes information on a voltage or current obtained from the received power signal in the power receiver 200. Thus, the signal processor 140 may process the reception power state signal and output the processed signal to the modulation controller 150.

The modulation controller 150 determines whether there is a need to change the resonant frequency when receiving the voltage information or the current information. In some embodiments, the modulation controller 150 may determine whether there is a need to change the modulation frequency for voltage information exceeding the reference voltage range through the voltage information. In addition, the modulation controller 150 may determine whether there is a need to change the modulation frequency for current information exceeding the reference current range through the current information.

When the modulation frequency needs to be changed, the modulation controller 150 changes the modulation frequency. In this case, the modulation controller 150 sequentially generates modulation frequencies within a predetermined frequency band (e.g., band of 100 kHz to 13 MHz). The modulation controller 150 provides the sequentially generated frequencies to the modulator 120. Thus, the modulation controller 150 may modulate a power signal at the modulation frequencies within the predetermined range.

In addition, the modulation controller 150 generates modulation frequencies using the frequencies within the predetermined range to modulate a power signal. Afterwards, the modulation controller 150 may select a modulation frequency having maximum power transmission performance (i.e., resonant frequency) using reception power state signals received through the reception coil unit 110. The modulation controller 150 outputs the selected modulation frequency having maximum power transmission performance to the modulator 120. Thus, the modulation controller 150 may modulate the power signal at the modulation frequency having maximum power transmission performance through the modulator 120.

The power receiver 200 receives the power from the power transmitter 100 and supplies the power to a connected load. The connected load is a power consumer that may include a mobile device, a home appliance, an industrial equipment, and an electric vehicle. Therefore, the power receiver 200 may be connected to a power consumer and incorporated in a power consumer. The power receiver 200 includes a reception coil unit 210, a power generator 220, a signal generator 230, and a load 240.

The reception coil unit 210 includes a reception coil. The reception coil unit 210 receives the power signal transmitted from the power transmitter 100. The reception coil unit 210 outputs the power signal to the power generator 220.

The power generator 220 may generate power supplied to the load 240 using the received power signal. The power generator 220 generates the received power signal as power of direct current (DC). The power generator 220 outputs the generated power to the load 240.

The signal generator 230 may obtain voltage information or current information from the generated power. The voltage information or current information of the power may be used to set a modulation frequency for power transmission (i.e., resonant frequency) in the power receiver 100. The signal generator 230 generates a reception power state signal including the voltage information and the current information obtained from the received power signal. The signal generator 230 outputs the reception power state signal to the reception coil unit 210, transmitting the reception power state signal to the transmission coil unit 130 corresponding to the reception coil unit 210.

There is a distance, i.e., spaced distance "d" between the transmission coil unit 130 and the reception coil unit 210 (or the power transmitter 100 and the power receiver 200). That is, the transmission coil unit 130 and the reception coil unit 210 may be disposed to be near or far from each other. In the inventive concept, the power transmitter 100 uses resonant characteristics (e.g., resonant frequency) to transmit power to the power receiver 200. For achieving this, the power transmitter 100 may transmit power to be transmitted to the power receiver 200 after modulating the power at a resonant frequency.

When receiving the reception power state signal from the power receiver 200, the power transmitter 100 searches a resonant frequency having maximum power transmission performance (minimum power transmission loss) within the predetermined frequency range, based on the reception power state signal. Thus, the power transmitter 100 may stably transmit the power to the power receiver 200 depending on variation of the distance "d" between the transmission and reception coil units 130 and 210.

Figure 2:
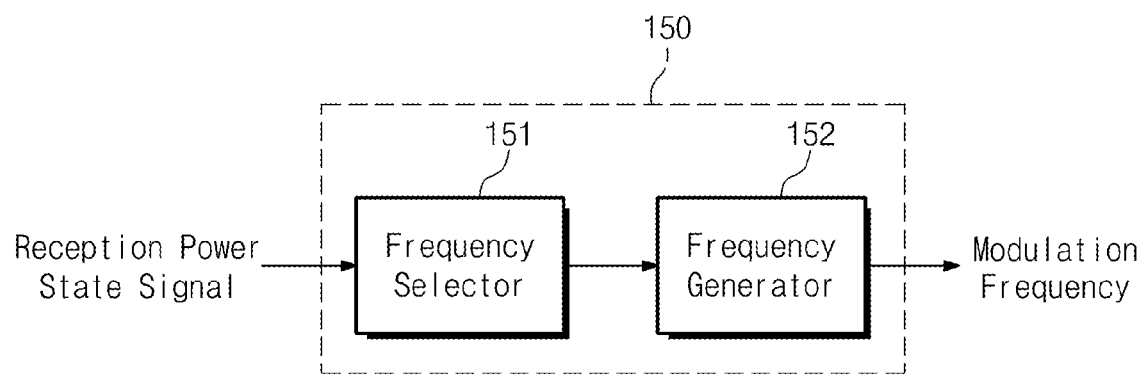
FIG. 2 exemplarily illustrates a modulation controller shown in FIG. 1.

Reference is made to FIG. 2, which exemplarily illustrates the modulation controller 150 shown in FIG. 2. The modulation controller 150 includes a frequency selector 151 and a frequency generator 152.

The frequency selector 151 receives a processed reception power state signal. According to the reception power state signal, the frequency selector 151 determines whether there is a need to change a resonant frequency. If there is a need to change the resonant frequency, the frequency selector 151 sequentially selects modulation frequencies within the predetermined frequency range. The frequency selector 151 outputs information on the selected modulation frequencies to the frequency generator 152.

The frequency generator 152 sequentially receives the information on the selected modulation frequencies and generates corresponding modulation frequencies. The frequency generator 152 provides the generated modulation frequencies to the modulator 120. By providing the modulation frequencies within the predetermined frequency range to the modulator 120, the power transmitter 100 may transmit a power signal at the modulation frequencies within the corresponding frequency range.

Through a reception power state signal received by changing a modulation frequency, the frequency selector 151 may select a modulation frequency having maximum power transmission performance, i.e., a resonant frequency as a frequency for power transmission.

Figure 3:
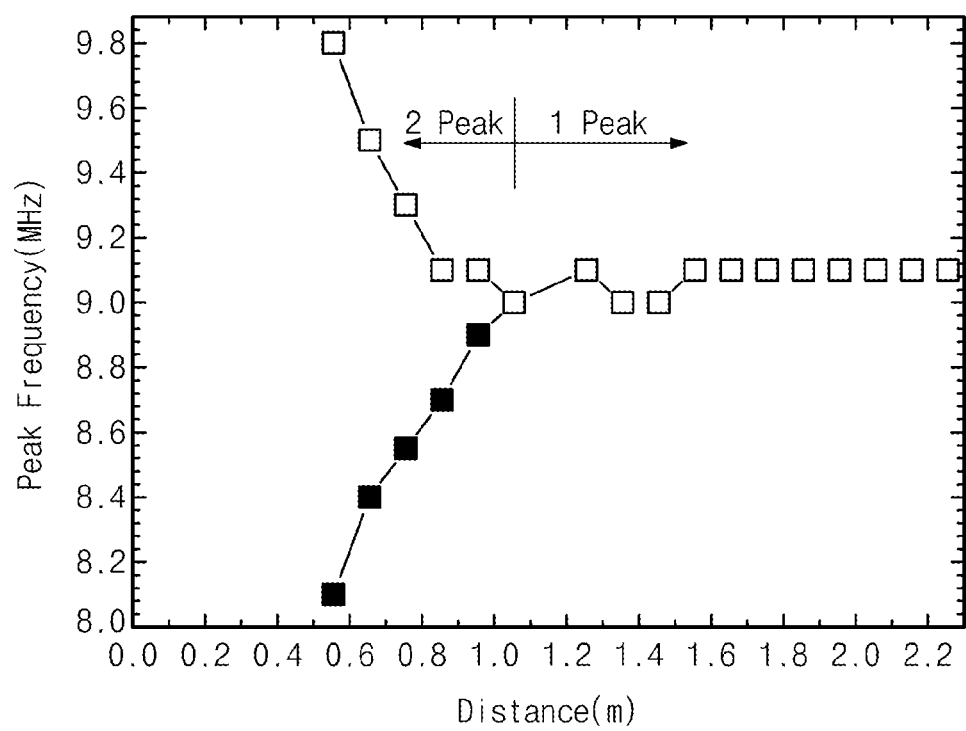
FIG. 3 is a graphic diagram exemplarily illustrating resonant frequency variation depending on distance variation of a power transmission system.

Reference is made to FIG. 3, which is a graphic diagram exemplarily illustrating change of a resonant frequency depending on distance variation of a power transmission system. In the graph in FIG. 3, a horizontal axis represents a distance "m" and a vertical axis represents a frequency (e.g., resonant frequency; MHz).

When a distance "d" between the transmission and reception coil units 130 and 210 (or between the power transmitter 100 and the power receiver 200) is 0.6 m to 1.0 m, a power transmission efficiency is maximum at two resonant frequencies.

When the distance "d" is 1.1 m or more, the power transmission efficiency is maximum at one resonant frequency. When the distance "d" is 1.6 m or more, a resonant frequency is converged in the band of about 9.1 MHz.

For example, when the distance "d" is 0.8 m, the power transmission efficiency is maximum in the band of about 8.6 MHz and the band of about 9.2 MHz. When the distance "d" is 1.2 m, the power transmission efficiency is maximum in the band of about 9.8 MHz.

Likewise, it can be confirmed that a resonant frequency is changed depending on the distance "d" between the reception and transmission coil units 130 and 210.

The power transmitter 100 according to the inventive concept may select and use resonant frequencies having maximum power transmission performance within a predetermined frequency band depending on variation of distance "d".

In the inventive concept, the transmission coil unit 140 of the power transmitter 100 and the reception coil unit 120 of the power receiver may each include two coils (e.g., two resonance bodies). In this case, when a distance "d" between the transmission coil unit 130 and the reception coil unit 210 decreases, maximum power transmission performance may be exhibited at two transmission frequencies. This corresponds to the distance "d" ranging from 0.6 m to 1.0 m.

At this point, the frequency selector 151 of the power transmitter 100 may select one of the two frequencies.

Figure 4:
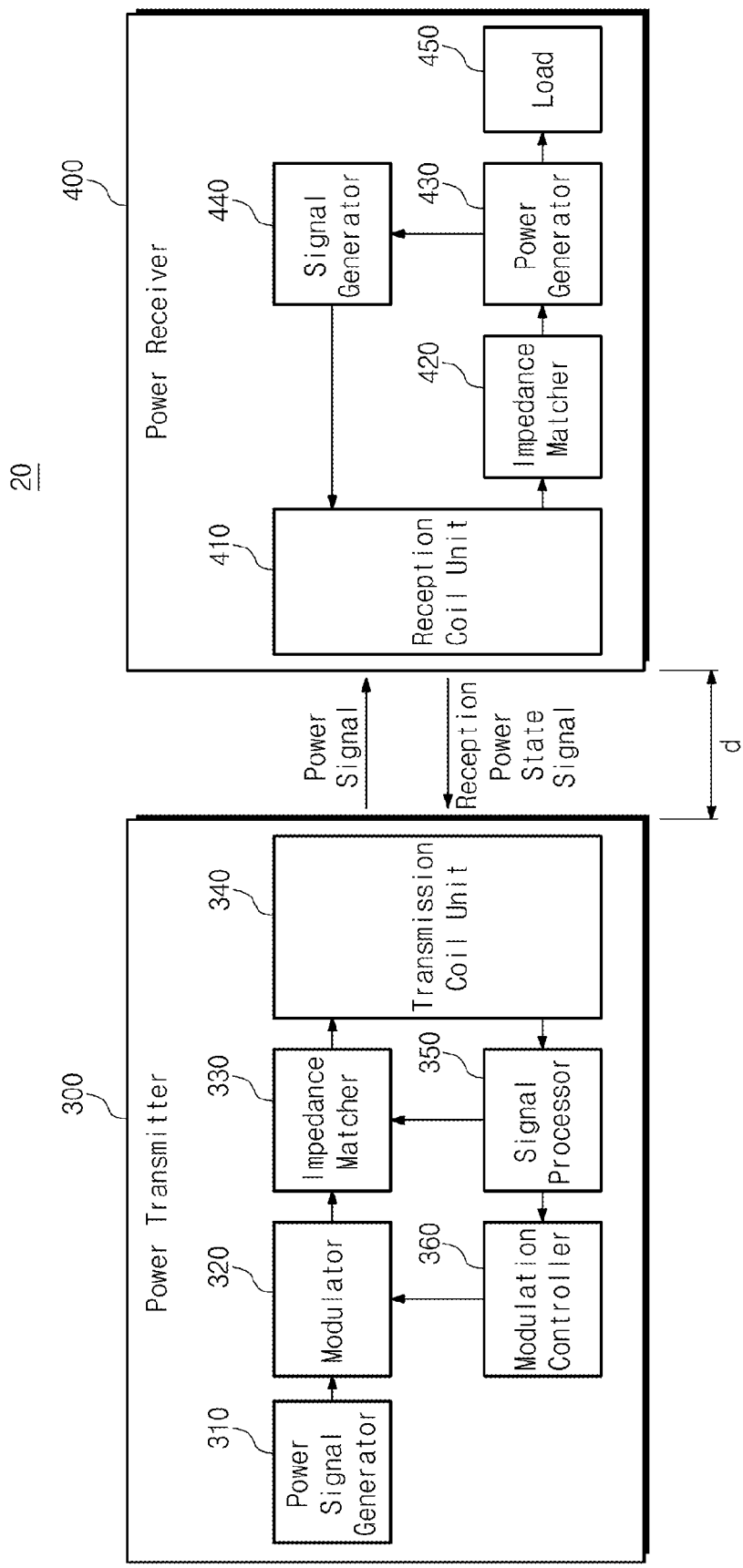
FIG. 4 illustrates a power transmission system according to another embodiment of the inventive concept.

Reference is made to FIG. 4, which illustrates a power transmission system 20 according to another embodiment of the inventive concept. The power transmission system 20 includes a power transmitter 300 and a power receiver 400. Unlike the power transmitter 100 and the power receiver 200 in FIG. 1, the power transmitter 300 and the power receiver 400 each further include an impedance matcher for impedance matching.

The power transmitter 300 may transmit power to the power receiver 400 in a wireless manner. The power transmitter 300 includes a power signal generator 310, a modulator 320, an impedance matcher 330, a reception coil unit 340, a signal processor 350, and a modulation controller 360.

The power signal generator 310 generates a power signal through an internal power source or a connected power source. The signal generator 310 outputs the generated power signal to the modulator 320.

The modulator 320 receives a power signal and modulates the received power signal using an input modulation frequency. The modulation frequency may be within a frequency band (e.g., band of 100 kHz to 13 MHz). The modulator 320 outputs the power signal modulated using the modulation frequency to the reception coil unit 330.

The impedance matcher 330 performs impedance matching for the modulated power signal. The impedance matching means that impedance values at the power transmitter 300 and the power receiver 400 match each other. For example, the impedance matcher 330 may match an impedance value on the basis of 50 ohms. The impedance matcher 330 outputs the impedance-matched power signal to the transmission coil unit 340.

The transmission coil unit 340 transmits the impedance-matched power signal to the power receiver 400. The transmission coil unit 340 may include, for example, two coils. The transmission coil unit 340 receives a reception power state signal from the power receiver 400. The transmission coil unit 340 outputs the reception power state signal to the signal processor 350.

The signal processor 350 may receive the reception power state signal, based on the reception power state signal. The reception power state signal includes information on a voltage or current obtained from the received power signal. Thus, the signal processor 350 may process the reception power state signal and output the processed signal to the impedance matcher 330 and the modulation controller 360.

When receiving the reception power state signal, the impedance matcher 330 may confirm that a distance from the power receiver 400 is varied. Thus, the impedance matcher 330 determines whether an impedance value is changed. In some embodiments, the impedance matcher 330 may determine whether there is a need to change the impedance value relative to voltage information exceeding the reference voltage range through the voltage information. In addition, the impedance matcher 330 may determine whether there is a need to change an impedance value relative to current information exceeding the reference current range through the current information.

When there is a need to change the impedance value, the impedance matcher 330 sequentially changes impedance values within a predetermined impedance range. The impedance matcher 330 may obtain an impedance matching value having maximum power transmission performance through the change of impedance value. The impedance matcher 330 may include a variable resistor for changing an impedance value.

The modulation controller 360 determines whether there is a need to change the resonant frequency when receiving the voltage information or the current information. In some embodiments, the modulation controller 360 may determine whether there is a need to change the modulation frequency for voltage information exceeding the reference voltage range through the voltage information. In addition, the modulation controller 360 may determine whether there is a need to change the modulation frequency for current information exceeding the reference current range through the current information.

When the modulation frequency needs to be changed, the modulation controller 360 changes the modulation frequency. In this case, the modulation controller 360 sequentially generates modulation frequencies within a predetermined frequency band (e.g., band of 100 kHz to 13 MHz). The modulation controller 360 provides the sequentially generated frequencies to the modulator 320. Thus, the modulation controller 360 may modulate a power signal at the modulation frequencies within the predetermined range.

In addition, the modulation controller 360 generates modulation frequencies using the frequencies within the predetermined range to modulate a power signal. Afterwards, the modulation controller 360 may select a modulation frequency having maximum power transmission performance (i.e., resonant frequency) using reception power state signals received through the reception coil unit 110. The modulation controller 360 outputs the selected modulation frequency having maximum power transmission performance to the modulator 320. Thus, the modulation controller 150 may modulate the power signal at the modulation frequency having maximum power transmission performance through the modulator 120. The modulation controller 360 may have the same configuration as the modulation controller 150 described in FIG. 2.

The power receiver 400 receives the power from the power transmitter 300 and supplies the power to a connected load. The connected load is a power consumer that may include a mobile device, a home appliance, an industrial equipment, and an electric vehicle. Therefore, the power receiver 400 may be connected to a power consumer and incorporated in a power consumer. The power receiver 400 includes a reception coil unit 410, a power generator 420, a signal generator 430, and a load 450.

The reception coil unit 410 includes a reception coil. The reception coil unit 410 receives the power signal transmitted from the power transmitter 300. The reception coil unit 410 outputs the power signal to the impedance matcher 420.

The impedance matcher 420 changes an impedance value depending on the power consumption of the load 450. The impedance matcher 420 outputs an impedance-matched power signal to the power generator 430. The impedance matcher 420 may include an overvoltage protection circuit (not shown) for protecting a power transmitter from an overvoltage. In some embodiments, when power to be transmitted to the load 450 is not required, the overvoltage protection circuit may generate a power-off signal transmitted to the power transmitter 300 to stop reception of a power signal.

The power generator 430 may generate power supplied to the load 450 using the impedance-matched power signal. The power generator 430 generates the impedance-matched power signal as power of direct current (DC). The power generator 430 outputs the generated power to the load 450.

The signal generator 440 may obtain voltage information or current information from the power generated by the power generator 430. The voltage information or current information of the power may be used to perform resonant frequency or impedance matching in the power receiver 100. The signal generator 440 generates a reception power state signal including the voltage information and the current information obtained from the received power signal. The signal generator 440 outputs the reception power state signal to the reception coil unit 410, transmitting the reception power state signal to the transmission coil unit 340 corresponding to the reception coil unit 410 through the reception coil unit 410.

There is a distance, i.e., spaced distance "d" between the transmission coil unit 340 and the reception coil unit 410 (or the power transmitter 300 and the power receiver 400). That is, the transmission coil unit 340 and the reception coil unit 410 may be disposed to be near or far from each other. In the inventive concept, the power transmitter 300 uses resonant characteristics (e.g., resonant frequency) to transmit power to the power receiver 400. For achieving this, the power transmitter 300 may transmit power to be transmitted to the power receiver 400 after modulating the power at a resonant frequency.

When receiving the reception power state signal from the power receiver 400, the power transmitter 300 searches a resonant frequency having maximum power transmission performance (minimum power transmission loss) within the predetermined frequency range, based on the reception power state signal. Thus, the power transmitter 300 may stably transmit the power to the power receiver 400 depending on variation of the distance "d" between the transmission and reception coil units 340 and 410.

In addition, the impedance value may be changed depending on variation of a distance between the power transmitter 300 and the power receiver 400. Accordingly, the power transmitter 300 and the power receiver 400 may include impedance matchers 330 and 420 therein, respectively, to perform impedance matching having maximum power transmission performance.

Figure 5:
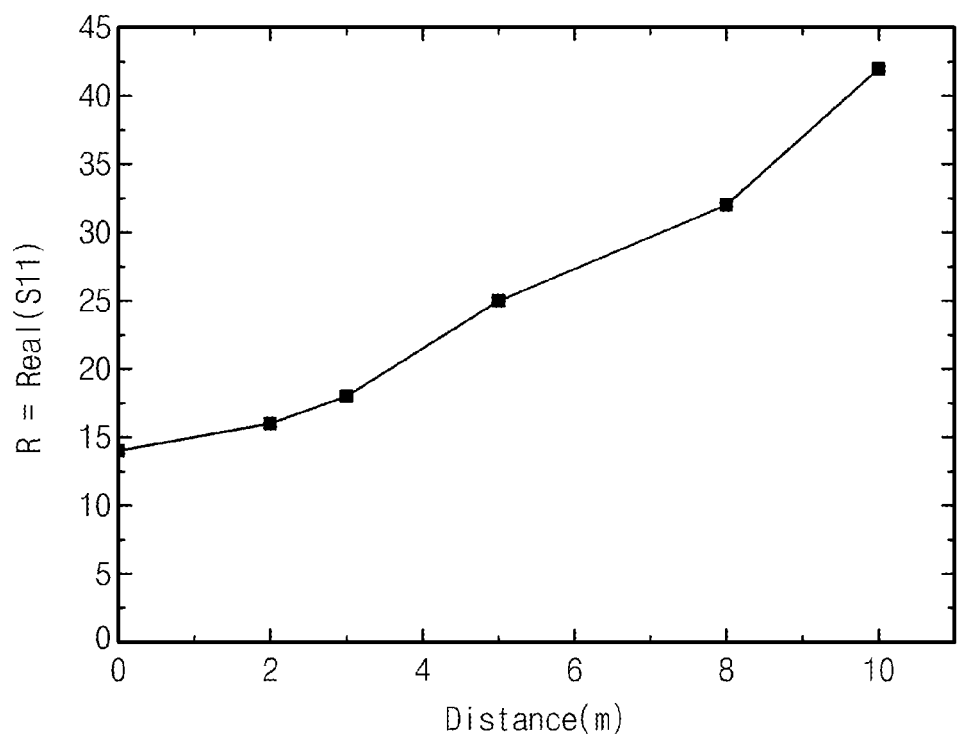
FIG. 5 is a graphic diagram exemplarily illustrating resonant frequency variation depending on distance variation of a power transmission system according to another embodiment of the inventive concept.

Reference is made to FIG. 5, which is a graphic diagram exemplarily illustrating resonant frequency variation depending on distance variation of a power transmission system according to another embodiment of the inventive concept. In the graph in FIG. 5, a horizontal axis represents a distance (cm) and a vertical axis represents an impedance Value®.

When a distance "d" between the transmission and reception coil units 340 and 410 (or the power transmitter 300 and the power receiver 400) is 0 cm, the impedance value is about 14. The unit of impedance denotes a real value of a reflection coefficient S11. When the distance "d" is 2 cm, the impedance value is about 16. When the distance "d" is 3 cm, the impedance value is about 18. When the distance "d" is 5 cm, the impedance value is about 25. When the distance "d" is 8 cm, the impedance value is about 32. When the distance "d" is 10 cm, the impedance value is about 42.

In some embodiments, the power transmitter 300 and the power receiver 400 may match impedances on the basis of 50 ohms, respectively.

An impedance value of the power transmitter 300 has a relationship as represented in the Equation 1 below.

$$Z_P = jwL_P(1 - k_P^2)\frac{\left(1 - \frac{w_r^2}{w^2}\right)}{\left(1 - \frac{w_0^2}{w^2}\right)}$$ [Equation 1]

In the Equation 1, $k_P$ represents a constant corresponding to a distance and changes from 0 to 1 depending the distance. Accordingly, $k_P$ is close to 0 as the distance "d" increases. At this point, an impedance value $Z_P$ of the power transmitter 300 reaches a certain constant. However, $k_P$ is close to 1 as the distance "d" decreases. At this point, the impedance value $Z_P$ of the power transmitter 300 decreases. Thus, the impedance matcher 330 of the power transmitter 300 performs impedance matching such that an impedance value changed depending on variation of the distance "d" has a constant impedance value.

The power receiver 400 changes an impedance value depending on variation of current used in the load 450. Accordingly, the impedance matcher 420 incorporated in the power receiver 400 may use an active load therein to constantly maintain current or a device (e.g., varicap diode (varactor)) therein to change a capacitance value.

Likewise, it can be confirmed that an impedance value for impedance matching is changed depending on a distance "d" between the transmission coil unit 340 and the reception coil unit 410. Thus, the power transmitter 300 and the power receiver 400 according to the inventive concept may each perform suitable impedance matching depending on distance variation.

Figure 6:
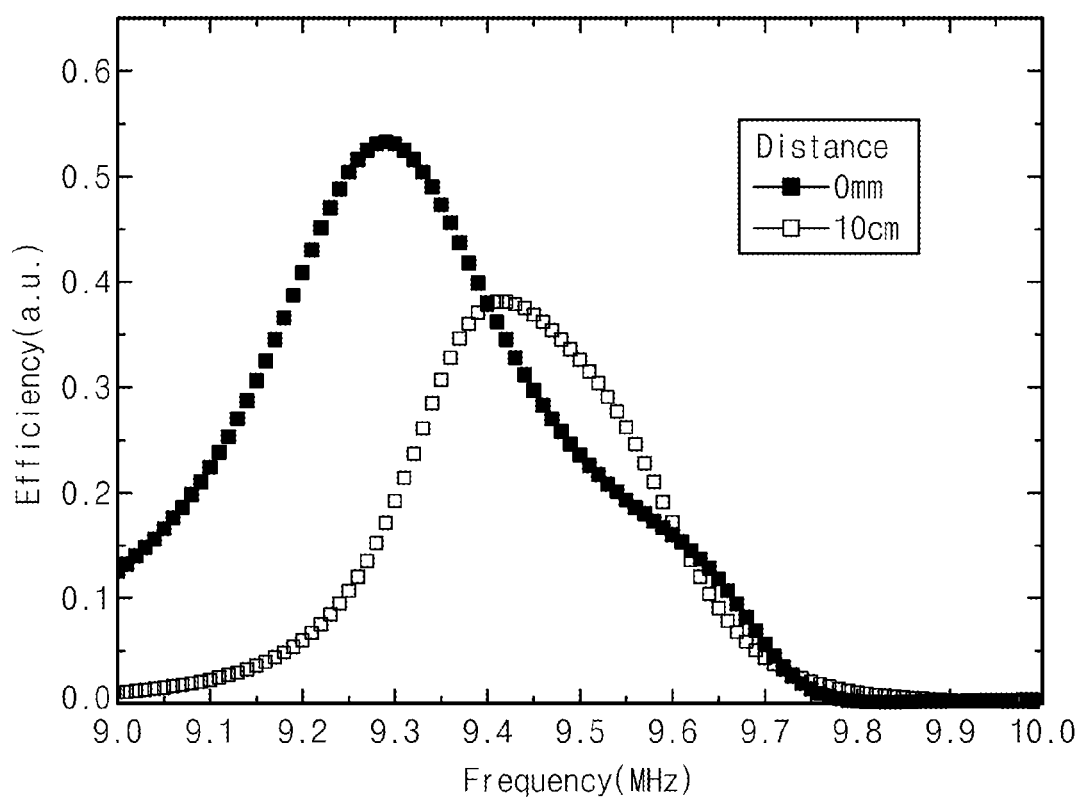
FIG. 6 is a graphic diagram illustrating a power transmission efficiency of a power transmitter and a power receiver according to an embodiment of the inventive concept.

Reference is made to FIG. 6, which is a graphic diagram illustrating a power transmission efficiency of a power transmitter and a power receiver according to an embodiment of the inventive concept. In the graph in FIG. 6, a horizontal axis represents a frequency, e.g., resonant frequency and a vertical axis represents a transmission frequency.

The graph shows transmission efficiencies when a distance "d" between the power transmitter 100/300 and the power receiver 200/400 is 0 cm and 10 cm.

When the distance "d" is 0 cm, the power transmitter 100 may modulate a power signal using a frequency with the band of 9.3 MHz. When the distance "d" is 10 cm, the power transmitter 100/300 may modulate a power signal using a frequency with the band of 9.4 MHz.

In the inventive concept, a power transmitter may transmit a power signal using a frequency (e.g., a resonant frequency) having maximum power transmission performance within a constant frequency band.

In the inventive concept, the power transmitter 100/300 may transmit power to a resonant frequency having maximum power transmission performance using a reception power state signal including information depending on variation of a distance "d" from the power receiver 200/400. Additionally, impedance matching may be performed depending on variation of distance "d" between the power transmitter 100/300 and the power receiver 200/400. Thus, the maximum power transmission performance may be maintained depending on the variation of distance "d" between the power transmitter 100/300 and the power receiver 200/400.

To sum up, according to the inventive concept, resonant frequency change or impedance matching is performed depending on variation of distance between a power transmitter and a power receiver to achieve maximum transmission efficiency depending on power transmission.

While the inventive concept has been particularly shown and described with reference to exemplary embodiments thereof, it will be apparent to those of ordinary skill in the art that various changes in form and detail may be made therein without departing from the spirit and scope of the inventive concept as defined by the following claims.

What is claimed is:

1. A power transmitter comprising:
    a signal processor configured to externally obtain a reception power state signal depending on variation of a distance between a transmission coil unit and a reception coil unit;
    a modulation controller configured to a modulation frequency for selecting a frequency band having maximum power transmission performance, based on the reception power state signal;
    a power signal generator configured to generate a power signal;
    a modulator configured to modulate the power signal in response to the modulation frequency; and
    the transmission coil unit configured to transmit the modulated power signal.

2. The power transmitter as set forth in claim 1, wherein the reception power state signal includes information on a voltage or current of received power.

3. The power transmitter as set forth in claim 1, wherein the modulation controller comprises:
    a frequency selector configured to sequentially select frequencies within a predetermined frequency range when a frequency does not have the maximum power transmission performance based on the reception power state signal; and
    a modulation frequency generator configured to generate a modulation frequency for modulating the power signal according to the selected frequencies.

4. The power transmitter as set forth in claim 3, wherein the frequency selector selects a frequency having maximum power transmission performance within the predetermined frequency range as a frequency for power transmission by using all frequencies within the predetermined frequency range when the modulation of the power signal is completed.

5. The power transmitter as set forth in claim 1, wherein the signal processor further comprises:
    an impedance matcher configured to change an impedance value to have a predetermined impedance value when there is a need to change the impedance value according to the reception power state signal.

6. A power receiver comprising:
    a reception coil unit configured to receive a power signal;
    a power generator configured to generate power by receiving the power signal from the reception coil unit; and
    a signal generator configured to generate a reception power state signal depending on the level of the generated power and transmit the reception power state signal to a transmission coil unit corresponding to the reception coil unit.

7. The power receiver as set forth in claim 6, wherein the reception power state signal includes information on a voltage or current of received power.

8. The power receiver as set forth in claim 6, further comprising:
    a load configured to consume the generated power; and
    an impedance matcher configured to output the power signal to the power generator through impedance matching depending on power consumption of the load.

* * * * *